UNITED STATES PATENT OFFICE.

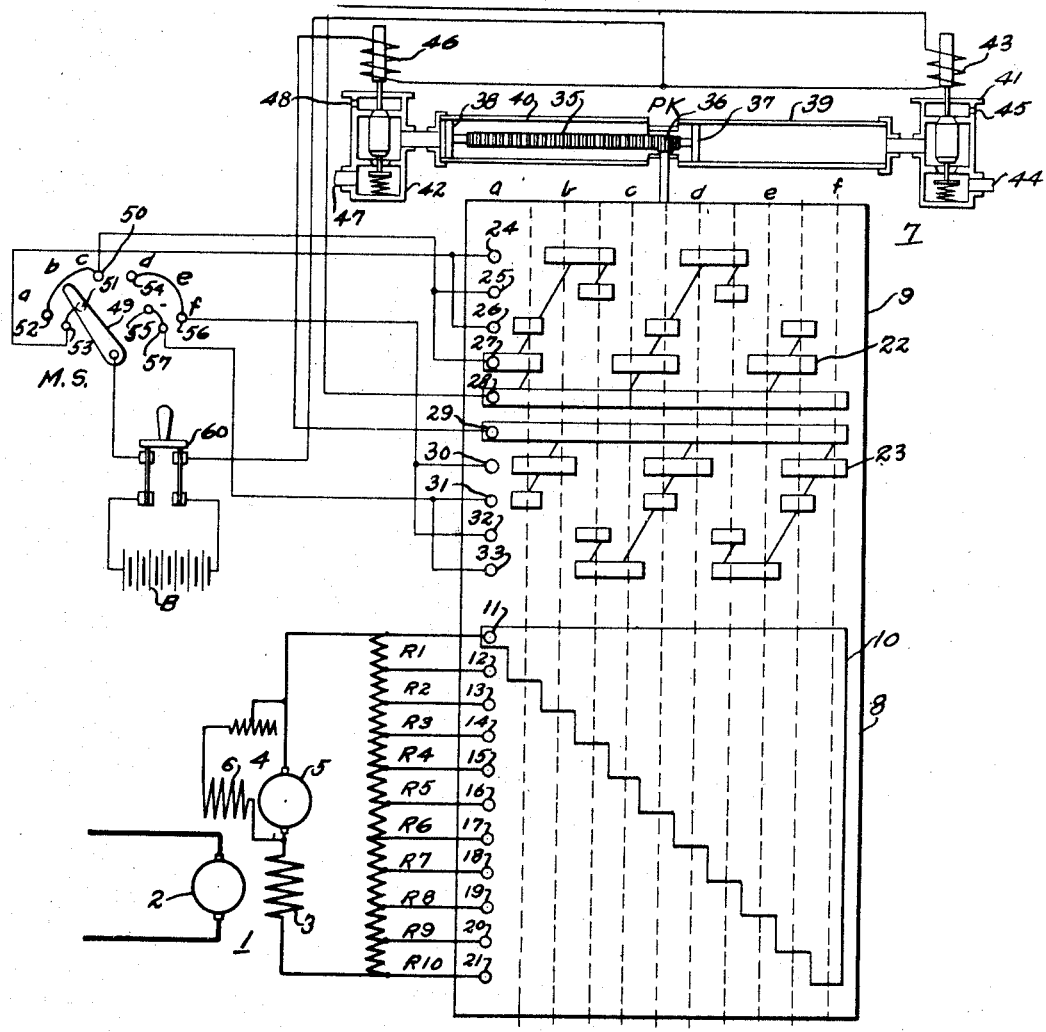

PAUL L. MARDIS AND ARTHUR J. HALL, OF WILKINSBURG, PENNSYLVANIA, ASSIGNORS TO WESTINGHOUSE ELECTRIC AND MANUFACTURING COMPANY, A CORPORATION OF PENNSYLVANIA.

CONTROL SYSTEM.

1,308,089.

Specification of Letters Patent. Patented July 1, 1919.

Application filed June 13, 1917. Serial No. 174,448.

*To all whom it may concern:*

Be it known that we, PAUL L. MARDIS, a citizen of the United States, and a resident of Wilkinsburg, in the county of Allegheny and State of Pennsylvania, and ARTHUR J. HALL, a subject of the King of England, and a resident of Wilkinsburg, in the county of Allegheny and State of Pennsylvania, have invented a new and useful Improvement in Control Systems, of which the following is a specification.

Our invention relates to systems of control and particularly to systems of control for governing the operation of dynamo-electric generators.

One object of our invention is to provide a control system that shall govern the excitation of a dynamo-electric generator in a simple and an improved manner.

Another object of our invention is to provide a control system having a dynamo-electric generator therein that shall have the excitation thereof varied automatically and at will under the control of a main controller governed by a master switch.

Another object of our invention is to provide a control system of the above-indicated character that shall embody a main controller having a rheostat drum for varying the excitation of an electric generator and an interlock drum and a master switch for governing the operation of the main controller.

More specifically, our invention embodies a dynamo-electric generator having an exciting generator associated therewith that is governed by a main controller in accordance with the movement of a master switch, the master switch being adapted to increase the excitation, automatically and at will, of the dynamo-electric generator when moving in one direction and to reduce the excitation, automatically and at will, of the dynamo-electric generator when the master switch is moved in a reverse direction.

In many power-plant installations now in service, it is essential to provide pilot motors for varying the resistors in the generator-field circuit and, by reason thereof, it is, in many cases, difficult to govern the generator-field excitation in a positive and an accurate manner.

In a system embodying our invention, a six-position master switch is associated with a fluid-operated main controller in a manner to vary the excitation, automatically or at will, of a dynamo-electric generator.

In the accompanying drawing, Figure 1 is a diagrammatic view of a control system embodying our invention, and Fig. 2 is a plan view of a fluid device for operating the main controller illustrated in Fig. 1 of the drawing.

Referring to Fig. 1 of the drawing, a generator 1, embodying an armature 2 and a field winding 3, is provided with an exciting generator 4 having an armature 5 and a field winding 6. In circuit with the exciting generator 4 and the field winding 3 of the generator 1 are a plurality of resistors R1 to R10, inclusive, for varying the excitation of the generator 1.

A main controller 7 embodying a rheostat drum 8 for short circuiting the resistors R1 to R10, inclusive, and an interlock drum 9, for a purpose to be described later, are adapted to be operated by a fluid device PK and to be controlled by a master switch MS.

The rheostat drum 8 embodies a contact segment 10 which is adapted to engage contact fingers 11 to 21, inclusive, when the main controller is moved through positions *a* to *f*, inclusive, and the interlock drum embodies two contact segments 22 and 23 which are adapted to engage the contact fingers 24 to 33, inclusive, when the main controller is moved through positions *a* to *f*, inclusive.

The apparatus PK embodies a rack 35 which engages a pinion 36 mounted on the shaft of the main controller 7 and is provided with pistons 37 and 38 which operate within the cylinders 39 and 40. The cylinders 39 and 40 are respectively provided with magnet valves 41 and 42 for governing the admission and release of air pressure to and from them. The magnet valve 41 is provided with an operating coil 43 that is adapted to connect the cylinder 39 to an air supply 44, when in the released position, and to exhaust the air pressure within the cylinder 39 through a port 45, when in an operative position. The magnet valve 42 is provided with an operating coil 46 and is adapted to connect the cylinder 40 to the air supply 47 when in a released position and to exhaust the air pressure within the cylinder 40 through a port 48 when in an operative position. The apparatus PK thus moves in the one or the other direction, dependent upon the particular magnet valve that is energized, the movement being toward the energized or closed (to the air supply) valve. A positive stopping of the main controller in the operative positions thereof is insured, because, when the active magnet valve is deenergized, which occurs in each controller position, as subsequently described in detail, high-pressure balanced conditions obtain in the apparatus, and the movement is immediately arrested.

The master switch MS embodies a contact arm 49 which is adapted to engage contact fingers 50, 51, 52 and 53 when moved through positions $a$, $b$ and $c$ to effect movement of the main controller 7 in a forward direction and to engage contact fingers 54, 55, 56 and 57 when moved through positions $d$, $e$ and $f$ to effect movement of the main controller 7 in a reverse direction. A switch 60 is provided for connecting a battery B to the auxiliary control circuits associated with the master switch MS and the apparatus PK.

The master switch MS, when in position $a$, is adapted to effect automatic movement of the main controller 7 in a forward direction in order to short circuit the resistors R1 to R10, inclusive, and when oscillated between positions $b$ and $c$, it is adapted to move the controller 7 in a forward direction in a step-by-step manner in order to effect an increased energization of the generator 1. When the master switch is oscillated between positions $d$ and $e$, the main controller 7 is moved in a reverse direction in a step-by-step manner, and, when the master switch is moved to position $f$, the main controller 7 is automatically moved in a reverse direction to insert the resistors R1 to R10, inclusive, in the circuit of the exciting generator 4 and of the generator field winding 3.

Assuming the apparatus to be in the position illustrated in Fig. 1, the main controller 7 may be advanced in a step-by-step manner and the resistors R1 to R10, inclusive, excluded from the circuit of the exciting generator 4 and of the field winding 3 as follows: When the contact arm 49 is moved to position $c$ to engage contact finger 50, a circuit is completed through the coil 43 of the magnet valve 41, which may be traced from one terminal of the battery B through the contact arm 49, contact finger 50, contact fingers 27 and 28—which are bridged by the contact segment 22—coil 43 of the magnet valve 41 and the switch 60 to the other terminal of the battery B. Thus, the magnet valve 41 is operated to release the air pressure contained within the cylinder 39 and to permit the air pressure acting on the piston 38 to move the apparatus PK and the main controller 7 to position $b$. In position $b$ of the main controller, the contact finger 27 is disengaged from contact with the contact segment 22 in order to deënergize the coil 43 of the magnet 41. The resistor drum 8, in moving from position $a$ to position $b$, short circuits the resistors R1 and R2.

When the contact arm 49 is moved from position $c$ to position $b$, a circuit is completed through the coil 43 of the magnet valve 41 which may be traced from one terminal of the battery B through the switch 60, contact arm 49, contact finger 51, contact fingers 24 and 28—which are bridged by the contact segment 22—and the coil 43 of the magnet valve 41 and the switch 60 to the other terminal of the battery B. Thus, the magnet valve 41 is operated to again release the pressure within the cylinder 39 and permit the main controller 7 to be advanced from position $b$ to position $c$. In position $c$ of the main controller, the contact finger 24 is disengaged from the contact segment 22 to deënergize the coil 43 of the magnet 22 and prevent further movement of valve 41 and the main controller, and the contact segment 10 of the resistor drum 8 is adapted to short-circuit the resistors R3 and R4 which are included in the circuit of the exciting generator 4.

In a similar manner, the main controller is moved through positions $d$, $e$ and $f$, and the resistors R5 to R10, inclusive, are excluded from the circuit of the exciting generator 4.

In case it is desired to automatically move the controller 7 in a forward direction from position $a$ to positon $f$, the contact arm 49 of the master switch MS is moved to position $a$ in order to connect the contact fingers 52 and 53 to the battery B. Thus, the contact fingers 24 to 27, inclusive, which are associated with the main controller 7, are directly connected to the battery B, and one of the same maintains a closed circuit through the coil 43 of the magnet valve 41 for moving the main controller in a forward direction until position $f$ is reached. In position $f$, the contact segment 22 becomes disengaged from contact with the contact fingers 24 to 27, inclusive.

Assuming the master switch to be in position $e$ and the main controller in position $f$ and it is desired to move the main controller in a reverse direction at will, the contact arm 49 of the main switch is moved from position $e$ to position $d$ in order to complete a circuit through the coil 46 of the magnet valve 42. The circuit through the coil 46 extends from one terminal of the battery B through switch 60, contact arm 49, contact finger 56, contact fingers 29 and 30— which are bridged by the contact segment 23—coil 46, and the switch 60 to the other terminal of the battery B. Thus, the magnet valve 42 is energized to effect movement of the main controller from position $f$ to position e, at which point the contact segment 23 is disengaged from contact with the contact finger 30 to break the circuit of the coil 46 and prevent further movement of the apparatus PK and the controller 7.

When the contact arm 49 is moved from position d to position e, a circuit is completed through the coil 46 of the magnet valve 42 from one terminal of the battery B through the contact arm 49, contact finger 55, contact fingers 33 and 29—which are bridged by the contact segment 23—coil 46 and the switch 60 to the other terminal of the battery B. Thus, the magnet valve 42 is again operated and the controller 7 is reversed from position e to position d, and, in a similar manner, when the main controller is reversed through positions c, b and a.

In case the main controller 7 is in position f, and it is desired to automatically and continuously move the same in a reverse direction to position a, the contact arm 49 of the master controller MS is moved to position f, in order to maintain a closed circuit from the battery B through the coil 46 of the magnet valve 42. The circuit through the coil 46 extends through one of the contact fingers 30 to 33, inclusive, contact segment 23 and the coil 46 of the magnet valve 42. The magnet valve 42 is maintained in an operative position until the main controller 7 is moved to position a.

From the above description, it will be noted that the excitation of the generator 1 is continuously and automatically increased when the contact arm 49 of the master switch is in position a; that the excitation of the generator 1 is constantly decreased if the contact arm 49 is in position f; that the oscillation of the contact arm 49 between positions b and c of the master switch will increase the excitation of the generator in a step-by-step manner, and that the oscillation of the contact arm 49 between positions d and e of the master switch will reduce the excitation of the generator 1 in a step-by-step manner.

Modifications in the system and arrangement and location of parts may be made within the spirit and scope of our invention and such modifications are intended to be covered by the appended claims.

We claim as our invention:

1. In a system of control for a dynamo-electric machine, the combination with a main controller having a rheostat drum for governing the excitation of the dynamo-electric machine, an interlock drum for governing the movement of the controller, and a fluid motor for operating the controller, of a six-position switch associated with said interlock drum and the fluid motor for moving the main controller automatically and at will in a forward and in a reverse direction.

2. In a system of control, the combination with a dynamo-electric machine and a main controller for governing the operation of the dynamo-electric machine, of means comprising a master switch for advancing the main controller at will in a forward direction when oscillated between two operative positions thereof and for moving the main controller at will in a reverse direction when oscillated between two other operative positions thereof.

3. In a system of control, the combination with a dynamo-electric machine, and a main controller having a rheostat drum for governing the excitation of the dynamo-electric machine, an interlock drum, and a fluid motor associated with said interlock drum, of means comprising a master switch associated with said interlock drum and the fluid motor for moving the main controller at will in a forward direction when oscillated between two of the operative positions thereof and for automatically moving the main controller in a forward direction when moved to a third operative position thereof.

4. In a system of control, the combination with a dynamo-electric machine and a main controller for governing the excitation of the dynamo-electric machine, of means comprising a master switch for advancing the main controller at will in a forward direction when oscillated between two of the operative positions thereof and for automatically moving the controller in a forward direction when the master switch is moved to a third operative position thereof.

5. In a system of control, the combination with a dynamo-electric machine, a main controller for governing the excitation of the dynamo-electric machine, and a fluid motor having two magnet valves for governing the operation of the controller, of a master controller having means associated therewith for operating one of said magnet valves to advance the main controller at will in a forward direction when the master switch is oscillated between two of the operative positions thereof.

6. In a system of control, the combination with a dynamo-electric machine, a main controller for governing the operation of the dynamo-electric machine, and a fluid motor having two magnet valves for operating the main controller, of a master switch having means associated therewith for operating one of said magnet valves to advance the main controller automatically and at will in a forward direction and for operating the other magnet valve to reverse the main controller automatically and at will.

7. In a system of control, the combination with a dynamo-electric machine, a main controller having a rheostat drum for governing the excitation of the dynamo-electric machine, an interlock drum associated with the rheostat drum, and a fluid motor having two magnet valves for operating the main controller, of a six-position master switch associated with said interlock drum for selectively operating said magnet valves to move the main controller automatically and at will in a forward and in a reverse direction.

8. In a system of control, the combination with a dynamo-electric machine and a main controller for governing the dynamo-electric machine and provided with a rheostat and an interlock drum, of a master switch and means associated with said interlock drum and the master switch, for operating the main controller in a forward and in a reverse direction at will and for insuring the positive stopping of the main controller in the operative positions thereof.

In testimony whereof, we have hereunto subscribed our names this 31st day of May, 1917.

PAUL L. MARDIS.
ARTHUR J. HALL.